United States Patent
Husson et al.

(10) Patent No.: US 8,757,221 B2
(45) Date of Patent: Jun. 24, 2014

(54) VEHICLE POWERED BY HYDROGEN FUELCELL AND SYSTEM FOR FUELLING SUCH VEHICLE

(75) Inventors: Geoffroy Husson, Ceintrey (FR); Gabriel Menier, Beauvais (FR)

(73) Assignee: Agco SA, Beauvais (FR)

( * ) Notice: Subject to any disclaimer, the term of this patent is extended or adjusted under 35 U.S.C. 154(b) by 464 days.

(21) Appl. No.: 13/123,551

(22) PCT Filed: Oct. 13, 2009

(86) PCT No.: PCT/EP2009/063360
§ 371 (c)(1),
(2), (4) Date: Apr. 11, 2011

(87) PCT Pub. No.: WO2010/043625
PCT Pub. Date: Apr. 22, 2010

(65) Prior Publication Data
US 2011/0297276 A1   Dec. 8, 2011

(30) Foreign Application Priority Data
Oct. 14, 2008   (GB) .................................. 0818799.9

(51) Int. Cl.
*B65B 1/20*   (2006.01)
(52) U.S. Cl.
USPC .......................................... 141/82; 429/444
(58) Field of Classification Search
USPC .......................................... 141/82; 429/444
See application file for complete search history.

(56) References Cited

U.S. PATENT DOCUMENTS

| 5,762,118 | A  | * | 6/1998 | Epworth et al. | 141/198 |
| 6,651,701 | B2 | * | 11/2003 | Kuriiwa et al. | 141/4 |
| 6,890,490 | B1 |   | 5/2005 | Fujita | |
| 7,419,735 | B2 | * | 9/2008 | Fujita | 429/444 |
| 8,256,449 | B2 | * | 9/2012 | Handa | 137/338 |
| 2002/0058171 | A1 |   | 5/2002 | Birk | |
| 2004/0229096 | A1 |   | 11/2004 | Standke | |
| 2005/0067045 | A1 | * | 3/2005 | McClure | 141/11 |
| 2006/0099469 | A1 | * | 5/2006 | Meltser et al. | 429/24 |
| 2008/0044704 | A1 |   | 2/2008 | Kubo | |

FOREIGN PATENT DOCUMENTS

| EP | 1291949 A2 | 3/2003 |
| EP | 1808923 A1 | 7/2007 |
| JP | 2002225577 A | 8/2002 |
| WO | WO-2005-105506 A1 | 11/2005 |
| WO | WO-2007-124946 A2 | 11/2007 |

OTHER PUBLICATIONS

UK Search Report provided for GB Application No. GB0818799.9 dated Jan. 23, 2009.
PCT Search Report for International Application No. PCT/EP2009/063360 dated Apr. 22, 2010.

* cited by examiner

*Primary Examiner* — Jason K Niesz

(57) ABSTRACT

A vehicle (10) comprises a hydrogen fuel ceil (12) and a hydrogen storage tank (14). The storage tank includes an intake valve for connecting with an external hydrogen source (26) to Fill the tank (14), A hydrogen supply line (16) is provided for supplying hydrogen to the fuel cell from the storage tank (14). Heat transfer means (14, 22) transfers heat from the storage tank (14) to the fuel cell (12). Heat expelled by the storage tank during filling thereof is captured and transferred to the fuel cell (12).

2 Claims, 1 Drawing Sheet

VEHICLE POWERED BY HYDROGEN FUELCELL AND SYSTEM FOR FUELLING SUCH VEHICLE

The invention relates to a vehicle powered by a hydrogen fuel cell and having an on-board storage tank for the hydrogen. Also the invention relates to a fuelling system for filling the on-board storage tank.

Increasing concern regarding harmful vehicle emissions in recent years has lead to the development of the hydrogen fuel cell to power vehicles. Today, several fuel-cell powered cars are commercially available.

The physics behind such the fuel cell concept is well known and a detailed description is not considered necessary here. For a more comprehensive description of a fuel cell reference is invited to the web page "Fuel cell", *Wikipedia, The Free Encyclopedia*, http://en.wikipedia.org/wiki/Fuel cell.

In summary, hydrogen gas is reacted with oxygen to produce water and electricity. The hydrogen is stored in an on-board pressurised tank in either liquid or gaseous form and is delivered to the fuel cell via a hydrogen supply line. The electricity generated by the fuel cell is used to power an electric motor, the torque generated by which is transmitted to the vehicle wheels.

The electro-chemical reaction within the fuel cell is highly exothermic and so the package must be cooled to maintain efficient operation. Furthermore, the expulsion of hydrogen from the storage tank leads to a reduction in pressure which can inhibit the reliable and uniform supply to the fuel cell.

EP-1,291,949, to which reference is invited, discloses a fuel cell system comprising a heat exchange unit between the fuel cell and a hydrogen adsorbing alloy tank. During normal operation, heat generated by the electrochemical reaction in the fuel cell is transmitted from the fuel cell to the hydrogen adsorbing alloy tank. This exploits the heat by-product from the fuel cell to increase the temperature and thus the internal pressure of the alloy tank. As a result, the hydrogen adsorbing alloy discharges the hydrogen gas with an endothermic reaction.

When starting in cold conditions, the fuel cell system of EP-1,291,949 transfers hydrogen from a high pressure hydrogen tank to the hydrogen adsorbing alloy tank. The heat given off by the resulting exothermic reaction of the alloy adsorbing the hydrogen is transmitted from the hydrogen adsorbing alloy tank to the fuel cell, thus aiding the starting up process.

Although the energy employed to heat the fuel cell during cold conditions is sourced internally from the system, the resulting reduction in internal pressure and/or temperature of the high pressure hydrogen tank reduces the quantity of hydrogen that can be extracted without the application of additional heat, albeit from the fuel cell at a later stage.

Thus, it is an object of the invention to provide a fuel-cell powered vehicle with a more efficient cold-start function.

According to the invention there is provided a vehicle comprising a hydrogen fuel cell, a hydrogen storage tank having an intake valve for connecting with an external hydrogen source to fill the tank, a hydrogen supply line for supplying hydrogen to the fuel cell from the storage tank, and heat transfer means to transfer heat from the storage tank to the fuel cell, wherein heat expelled by the storage tank during filling thereof is transferred to the fuel cell.

The term 'external hydrogen source' should be understood to mean any source of hydrogen which is not directly associated with the vehicle itself. For example, this may include a hydrogen filling station which is fixed in position.

The invention involves the recognition that the heat expelled by the hydrogen storage tank during the filling process can be exploited by the system to heat the fuel cell prior to starting up. This is particularly advantageous when the fuel cell is required to start in cold climatic conditions. By exploiting this otherwise lost heat energy the object of the invention is realised.

Whilst known technology continues to reduce the time required to fill the hydrogen storage tank, today the filling time remains significantly long, typically in the order of several hours. Therefore, an owner of such vehicle often connects the vehicle to an appropriate filling station overnight when the vehicle is not in use. Thus, in a preferred embodiment of the invention a fuelling system comprises a hydrogen source for connecting to the intake valve wherein the control of the filling is dependant upon a timer which can be set to activate the filling at a predetermined time. Advantageously the operator of the vehicle can therefore set the timer to start the filling process only several hours before the vehicle is required. In this way the heat energy expelled from the hydrogen storage tank during filling is transferred to the fuel cell so as to heat the fuel cell prior to starting.

The invention is applicable to any type of vehicle powered by a hydrogen fuel cell such as a car, a motor cycle or a lorry. However in a preferred embodiment the vehicle is a tractor which is often started during the early hours of the morning which is typically the coldest part of the day.

A specific embodiment of the invention will now be described with reference to the appended drawings in which.

Figure 1:
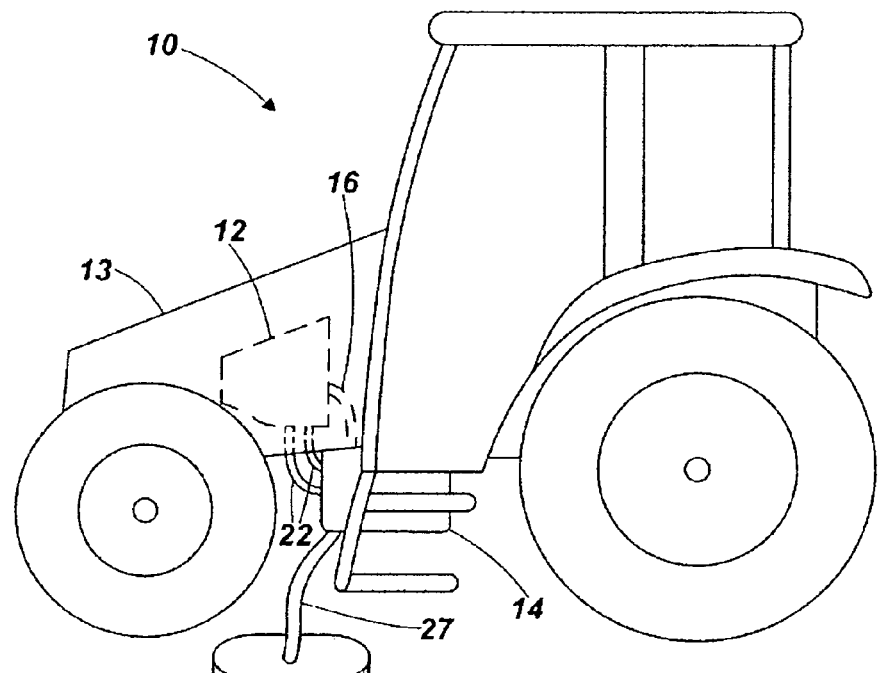
FIG. 1 is a tractor according to the invention.

With reference to FIG. 1, a tractor 10 comprises a fuel cell 12 located under a bonnet 13. The fuel cell 12 is of a known construction and which, in short, regulates an electrochemical reaction between hydrogen gas and oxygen to produce water and electricity. The generated electricity powers a motor 50 (FIG. 2) which powers the transmission of the tractor 10. Although shown as being located under the bonnet 13, the fuel cell 12 may be positioned elsewhere on the tractor 10 without deviating from the scope of the invention.

The tractor comprise a hydrogen storage tank 14 which stores the hydrogen in either liquid or gaseous form for supply to the fuel cell 12. A hydrogen supply line 16 is connected between the hydrogen storage tank 14 and the fuel cell 12 to deliver hydrogen for the electrochemical reaction.

Figure 2:
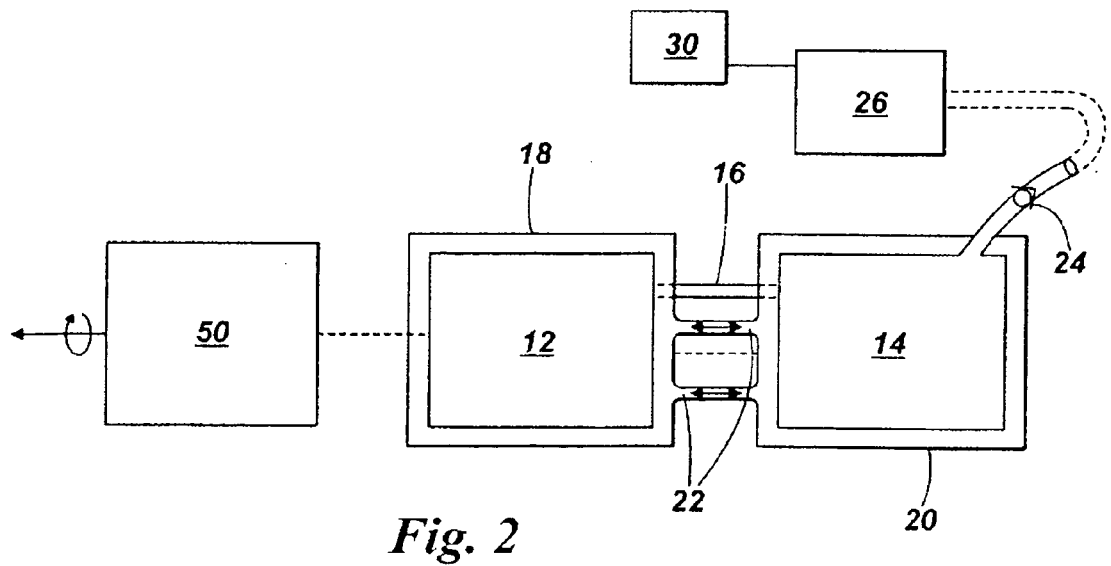
FIG. 2 shows a highly schematic layout of the fuel cell and hydrogen storage tank in accordance with the invention.

With reference also to FIG. 2 the fuel cell 12 and the hydrogen storage tank 14 each comprise a respective thermal envelope 18, 20 mutually connected by fluid-filled pipes 22. Fluid such as water flows between the two thermal envelopes 18, 20 via the pipes 22 so as to transfer heat energy from the storage tank 14 to the fuel cell 12 and vice versa.

The hydrogen storage tank 14 comprises an intake valve 24 which contains the fluid hydrogen stored under pressure whilst allowing hydrogen to be injected from an external hydrogen source 26. In this example the external hydrogen source 26 comprises an underground tank in which the hydrogen is stored under pressure. When the storage tank 14 requires filling the operator parks the tractor 10 near to the external hydrogen tank 26 and connects a pipe 27 from the tank 26 to the intake valve 24 in preparation for the filling process. The operator then sets a timer 30 which delays the supply of hydrogen from the external tank 26 to the storage tank 14.

When operating during the winter, the hydrogen storage tank 14 is preferably filled immediately prior to the time at which the fuel cell is required to start. For example if the filling process is predicted to take 3 hours and the tractor is required at 7 am then the operator will set the timer 30 to start the filling process at 4 am.

In accordance with the invention the heat expelled from the hydrogen storage tank 14 during the exothermic process of filling serves to heat the water in the envelope 20 which is then pumped to the envelope 18 surrounding the fuel cell 12 via the pipes 22. This transfers the expelled heat from the hydrogen storage tank 14 to the fuel cell 12. Advantageously, upon start up, the fuel cell is able to operate at a workable temperature.

The invention advantageously exploits the energy exerted by the external filling system 26 required to force the hydrogen into the storage tank 14 under pressure. This energy is expelled in the form of heat from the storage tank 14 and transferred to the fuel cell 12 by the fluid filled pipes. Furthermore the inclusion of a timer allows this energy to be exploited at the optimum time which is of a particular benefit in winter months. The delay advantageously minimises any loss of the captured heat to the relatively cold ambient air thus exploiting the, otherwise lost, heat to the best effect.

The invention claimed is:

1. A fuelling system comprising a vehicle comprising a hydrogen fuel cell, a hydrogen storage tank having an intake valve for connecting with an external hydrogen source to fill the tank, a hydrogen supply line for supplying hydrogen to the fuel cell from the storage tank, and a heat transfer mechanism to transfer heat from the storage tank to the fuel cell, wherein heat expelled by the storage tank during filling thereof is transferred to the fuel cell, the system further comprising an external hydrogen source for connecting to the intake valve, wherein control of the filling is dependent upon a timer which can be set to activate the filling at a predetermined time, wherein the heat transfer mechanism comprises a first thermal envelope associated with the hydrogen fuel cell and a second thermal envelope associated with the hydrogen storage tank, the first and second thermal envelopes fluidically connected together such that a fluid flows between the first and second thermal envelopes so as to transfer said heat between the storage tank to the fuel cell.

2. The fueling system of claim 1 wherein the first and second thermal envelopes are fluidically connected with fluid circulating pipes.

* * * * *